United States Patent
Mokeev et al.

(10) Patent No.: US 11,657,304 B2
(45) Date of Patent: May 23, 2023

(54) ASSESSING SIMILARITY BETWEEN ITEMS USING EMBEDDINGS PRODUCED USING A DISTRIBUTED TRAINING FRAMEWORK

(71) Applicant: Microsoft Technology Licensing, LLC, Redmond, WA (US)

(72) Inventors: Vladislav Mokeev, Lynnwood, WA (US); Skyler James Anderson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 407 days.

(21) Appl. No.: 16/864,964

(22) Filed: May 1, 2020

(65) Prior Publication Data
US 2021/0342711 A1    Nov. 4, 2021

(51) Int. Cl.
| | | |
|---|---|---|
| G06F 17/00 | (2019.01) | |
| G06F 7/00 | (2006.01) | |
| G06N 5/04 | (2023.01) | |
| G06N 20/00 | (2019.01) | |
| G06F 16/2457 | (2019.01) | |

(52) U.S. Cl.
CPC ......... *G06N 5/04* (2013.01); *G06F 16/24578* (2019.01); *G06N 20/00* (2019.01)

(58) Field of Classification Search
CPC ..... G06N 5/04; G06N 20/00; G06F 16/24578
USPC .......................................................... 706/11
See application file for complete search history.

(56) References Cited

U.S. PATENT DOCUMENTS

| | | | |
|---|---|---|---|
| 2007/0203940 A1 | 8/2007 | Wang et al. | |
| 2015/0293976 A1* | 10/2015 | Guo | G06F 16/24578 |
| | | | 707/706 |
| 2017/0193390 A1* | 7/2017 | Weston | G06Q 50/01 |
| 2017/0357890 A1* | 12/2017 | Kim | G06F 40/30 |

(Continued)

FOREIGN PATENT DOCUMENTS

WO    2016025412 A1    2/2016

OTHER PUBLICATIONS

PCT Search Report and Written Opinion for International Application No. PCT/US2021/023550, dated Jun. 30, 2021, 13 pages.

(Continued)

*Primary Examiner* — Pavan Mamillapalli

(57) ABSTRACT

A resource-efficient technique is described for producing and utilizing a set of trained embeddings. With respect to its training phase, the technique receives a group of sparsely-expressed training examples of high dimensionality. The technique processes the training examples using a distributed training framework of computing devices. With respect to its inference stage, the technique draws on the embeddings produced by the training framework. But in one implementation, the inference-stage processing applies a different prediction function than that used by the training framework. One implementation of interference-stage processing involves determining a distance between a query embedding and a candidate item embedding, where each such embedding is obtained or derived from the trained embeddings produced by the training framework. Another manifestation of inference-stage processing involves adjusting click counts based on identified relations among items embeddings.

26 Claims, 10 Drawing Sheets

(56) References Cited

U.S. PATENT DOCUMENTS

| | | | |
|---|---|---|---|
| 2018/0025721 A1* | 1/2018 | Li | G10L 15/26 |
| | | | 704/232 |
| 2018/0189269 A1* | 7/2018 | Quirk | G06F 40/30 |
| 2018/0300400 A1* | 10/2018 | Paulus | G06F 40/58 |
| 2020/0125956 A1* | 4/2020 | Ravi | G06N 3/084 |

OTHER PUBLICATIONS

"Factorization Machines Algorithm," in Amazon SageMaker Developer Guide, available at https://docs.aws.amazon.com/sagemaker/latest/dg/fact-machines.html, Amazon Web Services, Inc., accessed on Apr. 28, 2020, 2 pages.

McMahan, et al., "Communication-Efficient Learning of Deep Networks from Decentralized Data," arXiv:1602.05629v3 [cs.LG], Feb. 28, 2017, 11 pages.

Rendle, Steffen, "Factorization Machines," in 2010 IEEE International Conference on Data Mining, 2010, 6 pages.

"Stochastic gradient descent," available at https://en.wikipedia.org/wiki/Stochastic_gradient_descent, Wikipedia article, accessed on Apr. 19, 2020, 11 pages.

"MapReduce," available at https://en.wikipedia.org/wiki/MapReduce, Wikipedia article, accessed on Apr. 30, 2020, 13 pages.

* cited by examiner

ILLUSTRATIVE TRAINING EXAMPLE 202

DISTRIBUTED TRAINING FRAMEWORK 108

EMBEDDING-INITIALIZING NODES 302: $A_1, A_2, \ldots, A_p$

EMBEDDING-UPDATING NODES 304: $B_1, B_2, \ldots, B_q$

EMBEDDING-CONSOLIDATING NODES 306: $C_1, C_2, \ldots, C_r$

OVERVIEW OF OPERATION OF THE TRAINING-STAGE ENVIRONMENT 1002

PROVIDE A SET OF TRAINING EXAMPLES, EACH TRAINING EXAMPLE DESCRIBING A QUERY SUBMITTED BY AT LEAST ONE USER, AN ITEM, AND AN INDICATION OF WHETHER THE ITEM HAS BEEN SELECTED BY THE AT LEAST ONE USER IN RESPONSE TO SUBMITTING THE QUERY.
1004

PROVIDE INITIAL TOKEN EMBEDDINGS ASSOCIATED WITH DIFFERENT TRAINING EXAMPLES TO PLURAL RESPECTIVE EMBEDDING-UPDATING COMPUTING DEVICES.
1006

USE THE PLURAL EMBEDDING-UPDATING COMPUTING DEVICES TO GENERATE PLURAL SETS OF LOCAL TOKEN EMBEDDINGS.
1008

PROVIDE THE PLURAL SETS OF LOCAL TOKEN EMBEDDINGS TO PLURAL EMBEDDING-CONSOLIDATING COMPUTING DEVICES.
1010

USE THE PLURAL EMBEDDING-CONSOLIDATING COMPUTING DEVICES TO GENERATE PLURAL CONSOLIDATED TOKEN EMBEDDINGS FROM THE PLURAL SETS OF LOCAL TOKEN EMBEDDINGS, EACH CONSOLIDATED TOKEN EMBEDDING FOR A PARTICULAR TOKEN REPRESENTING A CONSOLIDATION OF ONE OR MORE LOCAL TOKEN EMBEDDINGS FOR THE PARTICULAR TOKEN.
1012

PROVIDE THE PLURAL CONSOLIDATED TOKEN EMBEDDINGS TO SELECTED EMBEDDING-UPDATING COMPUTING DEVICES.
1014

ASSESSING SIMILARITY BETWEEN ITEMS USING EMBEDDINGS PRODUCED USING A DISTRIBUTED TRAINING FRAMEWORK

BACKGROUND

Modern search engines commonly use machine-trained models to help determine whether a candidate item is a suitable match for a submitted query. The candidate item may correspond to a document, image, video, etc. Yet some of these machine-trained models are also highly complex, e.g., as evidenced by the fact that they include a large number of neural network layers and a large number of parameters. A training framework may require a significant amount of computing resources to produce such a complex model, particularly in those cases in which the training examples include vectors of high dimensionality. An inference-stage processing system may likewise require a significant amount of computing resources to run a complex model. The complexity of a model may also negatively affect the latency with which the inference-stage processing system operates on queries submitted by users.

SUMMARY

A resource-efficient technique is described herein for producing and utilizing a set of trained embeddings. In its training stage, the technique uses a distributed training framework to produce the trained embeddings by operating on a set of training examples. More specifically, the distributed training framework breaks the training task into plural independent (or mostly independent) tasks and then performs those tasks in a parallel manner. The use of a distributed training framework is particularly instrumental in allowing the technique to efficiently operate on training examples characterized by high dimensionality and sparsity of expression. In one implementation, each training example identifies a particular query, a candidate item, and an indication of whether the candidate item was selected by at least one user in response to submitting the query.

With respect to its inference stage, the technique relies on the embeddings already produced by the training framework. But in one implementation, the inference-stage processing applies a different prediction function than that used by the training framework. The interference-stage processing may avoid the use of a complex machine-trained model and high-dimensioned embeddings, which is one factor that allows the inference-stage processing to proceed in an expedited and resource-efficient manner.

In one application, the interference-stage processing involves determining a similarity score that describes an extent to which a candidate item under consideration is an appropriate match for a query submitted by a user. The determining operation, in turn, includes: identifying a query embedding associated with one or more tokens of the query; identifying an item embedding associated with the candidate item; and determining a distance between the query embedding and the item embedding in vector space. The query embedding and the item embedding are obtained or derived from the trained embeddings already produced by the training framework. For instance, the technique may generate the query embedding by identifying query-component embeddings that are associated with the tokens in the query, and then forming a sum of those query-component embeddings.

In another application, the interference-stage processing involves adjusting a number of clicks that a given item is considered to have received based on a weighted combination of clicks that other items have received, where all such clicks are made in response to the submission of a given query. The technique computes each weighting value for a pair of items by identifying embeddings associated with the items, and then determining the similarity between the embeddings. This interference-stage processing has the net effect of transferring clicks from popular documents to less popular documents, providing that the embeddings associated with these documents express similar intents. The technique can use embeddings produced by the above-described training framework or any other embedding-generating mechanism.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 shows a process that provides an overview of one manner of operation of the training-stage environment of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Figure 1:
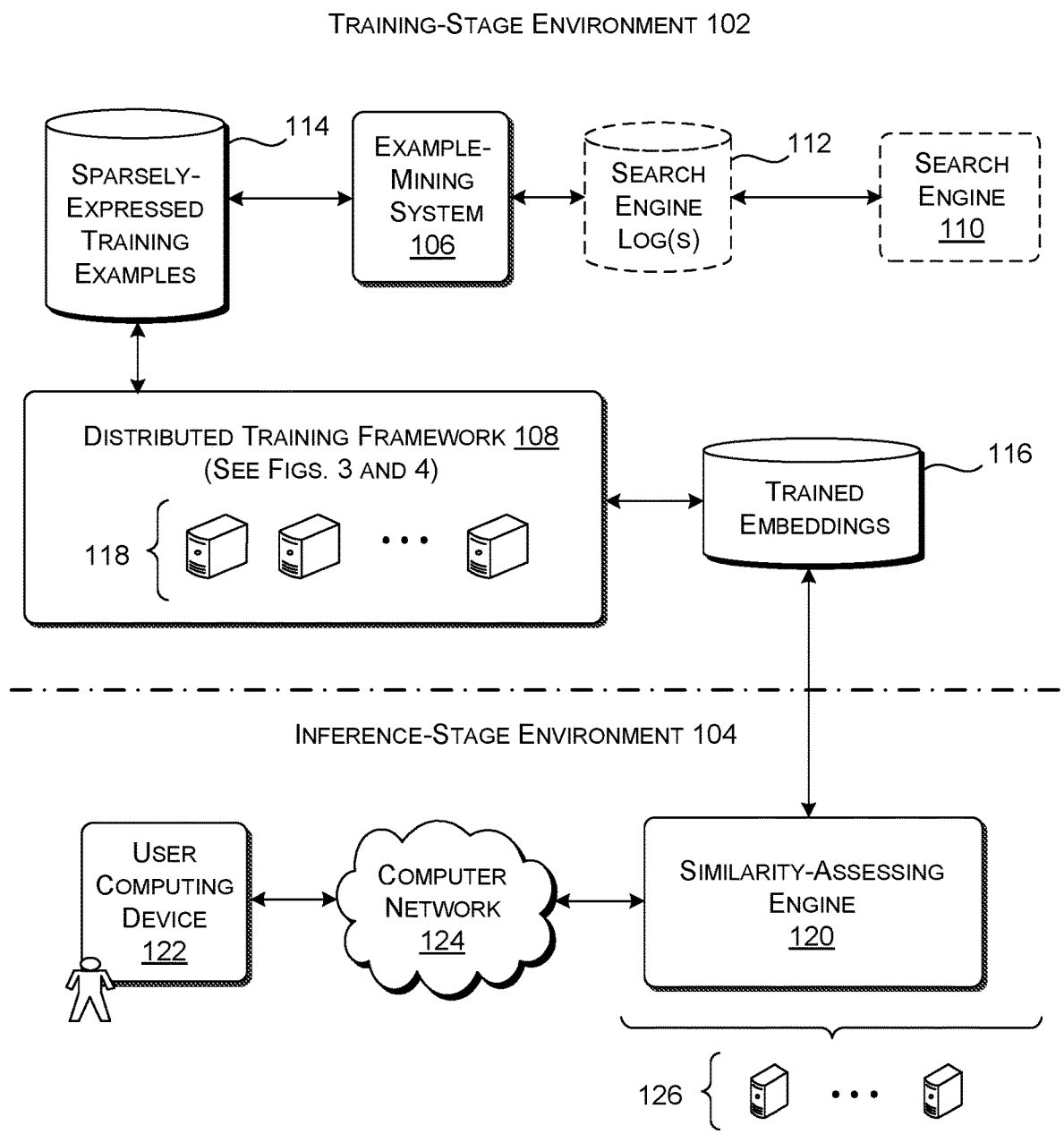
FIG. 1 shows an overview of a training environment for producing trained embeddings and an inference-stage environment for applying the trained embeddings.

This disclosure is organized as follows. Section A describes a computer-implemented environment for generating and applying trained embeddings. Section B sets forth illustrative methods that explain the operation of the computing environment of Section A. And Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "module," "logic," "engine," "system," and "tool" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be considered respective logic components and can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations.

A. Illustrative Computing Environment

FIG. 1 shows an overview of a training-stage environment 102 for producing trained embeddings and an inference-stage environment 104 for applying the trained embeddings produced by the training-stage environment 102. The following explanation will begin with an overview of the training-stage environment 102 and the inference-stage environment 104. The explanation will then provide additional details regarding individual components in these two environments (102, 104).

Beginning with the training-stage environment 102, an example-mining system 106 produces a set of training examples for processing by a training framework 108. In one implementation, the example-mining system 106 produces at least part of each training example based on one or more logs produced by a search engine 110 and stored in a data store 112. One training log corresponds to a "click log" that provides information regarding queries submitted by end-users over the course of plural search sessions, together with the items that users selected in response to those queries. For example, one entry in a click log may indicate that at least one user submitted the query "funny dog video." The click log further indicates that the user selected a particular video in response to submitting the query "funny dog video." For example, in response to the query, the search engine 110 may have served the user a search results page. The user may have clicked a link in the search results page associated with a video with a similar name to the query, e.g., "video of a funny dog." In other cases, the selected item may correspond to other kind of content, such as, but not limited to, a document, image, advertisement, audio file (e.g., song), etc. A click log may use any type of item identifier to represent a selected item, such as a Uniform Resource Locator (URL) assigned to the selected item.

In addition, or alternatively, the example-mining system 106 can provide other kinds of examples of relationships between queries and documents. For example, the example-mining 106 can provide a platform that allows a group of human analysts to manually indicate, for each of a plurality of documents, whether or not a given document is relevant to a given query. In still other cases, the example-mining system 106 can more generally identify relationships between actions performed by at least one user on one or more prior occasions. For example, the example-mining system 106 can extract examples from an action log that indicates that a user selected one item after selecting another item. However, to simplify the explanation, the explanation below will be based on the assumption that the example-mining system 106 relies on the type of click log described above that provides a record of items selected by users in response to submitting particular queries.

The example-mining system 106 can filter the click log information to exclude potentially low-quality training examples. For example, the example-mining system 106 can exclude items that are clicked a large number of times for different queries, where "large" is assessed with respect to an environment-specific threshold value. In addition, the example-mining system 106 can exclude examples that do not have a sufficient number of clicks for a given query, where again "low" is assessed with respect to any environment-specific threshold value.

The example-mining system 106 can formulate each training example as a series of vectors. Advancing momentarily to FIG. 2, this figure shows an illustrative training example produced based on information from a click log. It indicates that at least one user submitted the query "funny dog video," and, in response, clicked on an item having an identifier D3. The example-mining system 106 can represent each word in the query using a one-hot vector. Alternatively, the example-mining system 106 can represent each n-gram (e.g., each tri-gram) in a query as a one-hot vector. For example, the example-mining system 106 can representing the query "funny dog video" with one-hot vectors respectively associated with the tri-grams "\tfu," "fun," "unn," and "nny," "ny_," "y_d," "_do," "dog," etc., where "t\" is a symbol that denotes the start of a query, and "_" designates a space between tokens. The example-mining system 106 can represent each such tri-gram as a one-hot vector. The example-mining system 106 can represent the item D3 as another one-hot vector. A one-hot vector corresponds to a vector that dedicates a dimension to each token in a vocabulary, and which stores a "1" entry provided in a dimension associated with the particular item being represented, and a "0" entry for all other items in the vocabulary. For instance, the example-mining system 106 can represent the word "funny" by storing a "1" entry in a dimension associated with the word "funny," and a "0" entry for the other entries.

As can be appreciated, the training example 202 in aggregate has a relatively large size. For instance, each item vector alone has a dimensionality at least as large as a total number of items that can be selected in a master set of items, which may include several million items or more. The training example 202 can also be said to be sparse in the sense that it includes "1" entries for only those dimensions associated with the tokens in the query and the selected item D3; the remainder of the dimensions have "0" entries.

The type of example described above is a positive example because the click log contains evidence that at least one user did in fact click on item D3 after submitting the query "funny dog video." Although not shown, the example-mining system 106 can also produce a set of negative training examples. Each negative training example includes a query extracted from a search log together with a randomly-selected item identifier. In most cases, because the item is randomly selected, it will not be an appropriate match for the query. This assumption can be tested by determining whether there is in fact a positive relationship between a randomly-selected item and a query; if so, this pairing can be discarded as a viable negative example.

Returning to FIG. 1, the example-mining system 106 can store at least some of the training examples in a data store 114. The training framework 108 then uses machine-learning to iteratively operate on the training examples to produce a set of trained embeddings. For example, for the training example of FIG. 2, the training framework 108 can produce an embedding for each word and/or each tri-gram in the query "funny dog video." The training framework 108 can produce another trained embedding that identifies the item D3.

More generally, a trained embedding corresponds to a factorized or distributed representation of a piece of information expressed using a vector having a dimensionality of k. The dimensionality k is a tunable parameter. In one non-limiting implementation, k is set to 16. A factorized or distributed embedding generally may use plural "1" entries in respective dimensions to express an item. This contrasts with a one-hot vector, which assigns dedicated slots of its vectors to respective items. The training framework 108 stores its set of trained embeddings in a data store 116.

As will be explained in greater detail below, the training framework 108 uses a distributed set of computing devices 118. The computing devices 118 may correspond to respective servers provided at a single location or distributed over plural locations. From a logical perspective, the plural computing devices 118 implement different processing nodes that perform different respective functions. Each processing node is implemented by some portion of the computing resources provided by one or more computing devices. In some cases, a single computing device may implement a single processing node. In other cases, a single computing device may host two or more processing nodes; these processing nodes can perform the same functions or any combination of different functions. For example, a single computing device can host two processing nodes that simultaneously perform function A and function B, or that perform function A followed by function B. In still other cases, two or more computing devices can implement a single processing node. To simplify explanation, the following explanation will assume that each processing node maps to at least one computing device. Per the explanation above, however, this does not mean that the computing device is exclusively devoted to implementing only that processing node, or that the processing node is hosted in its entirety by the computing device.

The training framework 108 generally can be said to break a training operation into a flow of functions that it iteratively performs until a training objective is achieved. In performing each iteration, the training framework 108 also executes plural instances of this flow. This manner of operation allow the training framework 108 to generate the trained embeddings without overwhelming the processing capabilities of any of its computing devices. This aspect of the training framework 108 also expedites the generation of the trained embeddings. As will be clarified in greater detail below, the training framework 108 can efficiently execute parallel operations because these operations are largely (or entirely) independent of each other. For instance, the operations depend on a minimal number of shared parameters (e.g., a single global bias parameter) or possibly no shared parameters.

Now referring to the interference-stage environment 104, a similarity-assessing engine 120 uses the trained embeddings provided in the data store 116 to perform some type of real-time or backend analysis. In the example of FIG. 1, the similarity-assessing engine 120 receives a query submitted by a user via a user computing device 122, over a computer network 124. The similarity-assessing engine 120 can then generate a similarity score that identifies an extent to which the submitted query is deemed similar to a candidate item under consideration. For instance, the candidate item under consideration may correspond to a document, image, video, etc. The similarity-assessing engine 120 can then provide an output result to the user that conveys the level of similarity.

In one commercial context, the search engine 110 may incorporate the above type of similarity-assessing engine 120. That is, the search engine 110 can use a preliminary matching process to identify a group of candidate items that may be appropriate for the query. The search engine 110 can then use the similarity-assessing engine 120 to successively generate a similarity score for each candidate item in the group. The search engine 110 can then rank the candidate items by their similarity scores, and select the n candidate items having the best similarity scores. The search engine 110 can optionally take other matching criteria into consideration in generating this list, including any type of lexical features, semantic features, contextual features, etc. Finally, the search engine 110 can produce a search results page that provides snippets associated with the top-ranking candidate items.

In another implementation, the similarity-assessing engine 120 may rely on any type of search algorithm to find the item embeddings in the data store 116 that are closest to the query embedding associated with the submitted query. For instance, the similarity-assessing engine 120 can rely on an approximate nearest neighbor (ANN) technique to perform this function. Here, the search engine 110 need not first generate an initial list of candidate items for consideration.

The operation of the above type of similarity-assessing engine 120 will be explained in greater detail with reference to FIG. 6. By way of introduction to that later explanation, the similarity-assessing engine 120 provides a query embedding based on one or more trained embeddings provided in the data store 116. The similarity-assessing engine 120 also provides an item embedding for a particular candidate item under consideration based on one or more trained embeddings provided in the data store 116. The similarity-assessing engine 120 can then determine the distance between the query embedding and the item embedding in vector space, to provide a similarity score between the query and the candidate item. It can compute this distance using any metric, such as cosine similarity, Manhattan distance, etc.

The above type of search applications are cited by way of example, not limitation. In another example, a chatbot engine can use the similarity-assessing engine 120 to determine an appropriate answer, given a question submitted by the user. In another example, an advertising engine can use the similarity-assessing engine 120 to determine an appropriate advertisement to be served to the user, given the user's current context. For example, the currently context may depend on a web page that the user is using, and/or a click selection made by the user. In another example, an item-organizing engine may use the similarity-assessing engine 120 to generate clusters of embeddings that lie within a prescribed distance of each other in a vector space. The candidate items associated with these mutually-proximate embeddings form a group of similar items. For example, an image-organizing tool can use this functionality to identify groups of related digital photographs. In another example, a trend-analysis engine may use the similarity-assessing engine 120 to determine trends of a user's behavior with respect selecting, editing, sending, and/or receiving items.

In yet another example described with greater detail below in connection with FIG. 8, an application can use the similarity-assessing engine 120 to adjust the clicks that items are presumed to have received. This application operates by distributing clicks received by a first item to at least one other related item. The number of clicks that the first item contributes to the other item depends on a degree of relation of the first item to the other item. This application determines the relation between two items by determining the distance between their embeddings within a vector space.

In some implementations, one or more servers 126 implement the entirety of the similarity-assessing engine 120. The user may interact with the similarity-assessing engine 120 using a browser application provided by the user computing device 122. The user computing device 122 may correspond to any type of apparatus that performs a computing function, such as a desktop personal computing device, any type of handheld computing device (e.g., a smartphone, a tablet-type computing device, etc.), a game console, an Internet-of-Things (IoT) device, an intelligent appliance, a wearable computing device, a mixed-reality device, and so on. The computer network 124 may correspond to a wide area network (e.g., the Internet), a local area network, one or more point-to-point communication links, etc., or any combination thereof. In other implementations, each user computing device can provide a local manifestation of the similarity-assessing engine 120. In still other implementations, the servers 126 implement some functions of the similarity-assessing engine 120 and each local user computing device 122 implements other functions of the similarity-assessing engine 120.

As a first general point, the similarity-assessing engine 120 relies on trained embeddings already produced by the training framework 108. By virtue of this fact, the similarity-assessing engine 120 does not necessarily require the execution of a complex machine-trained model when processing a user's query. And for this reason, the similarity-assessing engine 120 can be expected to consume less computing resources compared to systems that invoke complex machine-trained models to process a query. The computing resources include memory, processing, and data storage resources. The similarity-assessing engine 120 can also be expected to offer better latency-related performance compared to systems that invoke complex machine-trained models to process the user's query.

It is true that the training-stage environment 102 must re-invoke the training framework 108 whenever a new training example is introduced. This is appropriate, for instance, when a developer wishes to add new item embeddings to the data store 116. But the cost of this operation may be preferable to dynamically generating an embedding using a machine-trained model during inference-stage processing. Further note that a new training example typically requires generating and adding only a few new embeddings to the data store 116, rather than readjusting all of the weights of a large machine-trained model. The training-stage environment 102 achieves this behavior because the work it performs on embeddings is mostly or entirely severable from the work it performs on other embeddings. And the focus of training is on the production of specific embeddings, not the generation or updating of a massive machine-trained model to be deployed in the inference-stage environment 104. Another way of making this point is to say that the training-stage environment 102 is scalable in a way that a conventional machine-training platform is not.

As a second general point, the similarity-assessing engine 120 can operate based on relatively small-sized embeddings, e.g., having a dimensionality of k=16 in one merely illustrative case. This factor also makes the similarity-assessing engine 120 more resource-efficient compared to engines that involve the processing of larger vectors.

As a third general point that is related to the first point, the training framework 108 uses a first prediction function in the course of generating the trained embeddings. That is, the training framework 108 uses the first prediction function to generate a prediction that indicates whether a query specified in a training example will result in a click on an item also specified in the training example. The similarity-assessing engine 120 uses a second prediction function that measures the extent to which a submitted query is deemed similar to a candidate item. The first prediction function need not be the same as the second prediction function. Indeed, the second prediction function can be less complex and less computationally intensive compared to the first prediction function. This aspect of the inference-stage environment 104 also sets it apart from conventional machine-trained models. In the usual case, a machine-trained model applied in an inference stage represents the same model that has been trained in the training stage. The approach used in FIG. 1 is efficient because it involves using a single set of embeddings for potentially plural downstream applications that use different logic for assessing similarity. That is, the approach is efficient because it eliminates the time and resources that would otherwise go into generating custom embeddings dedicated to particular end-use applications.

Figures 2, 3:
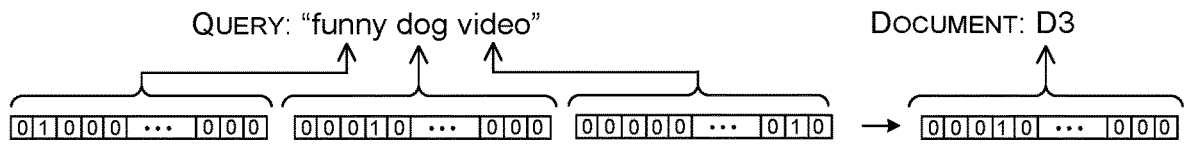
FIG. 2 shows an illustrative training example that may be processed by the training framework of FIG. 1.
FIG. 3 shows an overview of a distributed training framework, which is part of the training environment shown in FIG. 1.

FIG. 3 provides an overview of different types of processing nodes that may be used by the training framework 108. A first group of plural processing nodes 302 generates initial embeddings for a set of training examples. These kinds of processing nodes are referred to herein as embedding-initializing nodes. Two or more computing devices implement the embedding-initializing nodes. A second group of plural processing nodes 304 performs respective local training operations on respective examples to produce local token embeddings. These kinds of processing nodes are referred to herein as embedding-updating nodes. Two or more computing devices implement the embedding-updating nodes. A third group of plural processing nodes 306 consolidates sets of local token embeddings, to produce consolidated token embeddings. These kinds of processing nodes are referred to herein as embedding-consolidating nodes. Two or more computing devices implement the embedding consolidating nodes. Note that the above node types are cited by way of example, not limitation; other implementations can partition the training task into other combinations of node types. As a further reminder, any computing device can implement two or more different kinds of processing nodes.

In one implementation, the training framework 108 includes a central control computing device (not shown) that initiates the training process and performs other high-level configuration tasks. But the processing nodes in the training framework 108 otherwise operate in an autonomous manner, sending information among themselves in a peer-to-peer fashion.

Figure 4:
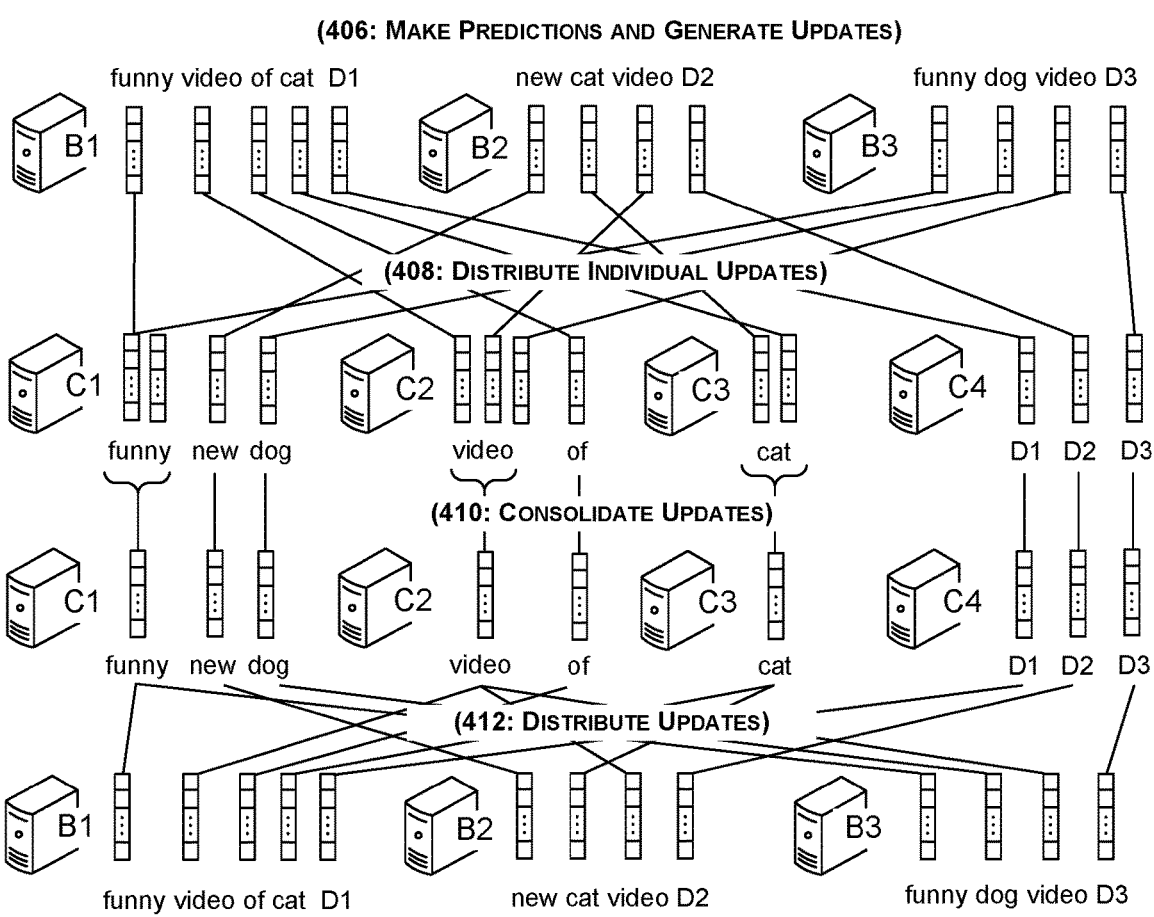
FIG. 4 shows an example of the operation of the training framework of FIG. 3.

FIG. 4 shows an example of the operation of the training framework 108 of FIG. 4. In this simplified case, the training examples include a first example in which at least one user has submitted the query "funny dog video" and then clicked on an item D3. It includes a second training example in which at least one user has submitted the query "new cat video" and then clicked on an item D2. It includes a third example in which at least one user has submitted a query "funny video of cat" and then clicked on an item D1. In the example of FIG. 4, the training framework 108 processes queries in word-level granularity. But other implementations can process queries in n-gram-level granularity (such as tri-gram-level granularity), or a combination of n-gram-level and word-level granularity. Although not shown in the example of FIG. 4, the training framework 108 also processes negative training examples. As set forth above, the example-mining system 106 produces a negative training example by randomly associating a query with an item, based on the presumption that the item will not be a good match for the query.

In a first operation 402, the training framework 108 uses one or more embedding-initializing nodes (A1, A2, A3, A4) to produce initial embeddings for the unique tokens in the training examples. For example, the embedding-initializing node A1 produces initial embeddings for the words "funny" and "new." An embedding-initializing node A2 produces initial embeddings for the words "cat" and "dog," and so on. The training framework 108 can use any mapping function to assign words to embedding-initializing nodes. For instance, the training framework 108 can hash each word into a key, and then use the key to find an embedding-initializing node that will process the word. Each embedding-initializing node can use any function to produce an initial embedding, such as using a trained neural network or lookup table to map the word to a vector.

In operation 404, the training framework 108 can assign a set of training examples to one or more embedding-updating nodes (B1, B2, B3). For example, the training framework 108 assign the third training example to an embedding-updating node B 1, the second training example to an embedding-updating node B2, and the first training example to an embedding-updating node B3. The training framework 108 can use any mapping function to assign words to embedding-updating nodes. For instance, the training framework 108 can hash each query and item identifier associated with a training example to a key, and then use the key to find an embedding-updating node that will process the training example.

In operation 404, the training framework 108 also distributes initial embeddings to the selected embedding-updating nodes. For example, the training framework 108 distributes the initial embeddings for "funny," "video," "of," and "cat" to the embedding-updating node B1 because this node will require these embeddings to process the third example to which it has been assigned.

In operation 406, each embedding-updating node produces a prediction of whether the query associated with a training example will result in clicking on the item associated with the training example. For example, the embedding-updating node B1 will apply a prediction function that specifies whether the query "funny video of cat" will result in clicking on the item D1. The training example also provides ground-truth information that indicates whether or not the item does indeed match the query. In the case, of embedding-updating node B1, the presumption is that the item D3 is in fact a good match for the query "funny video of cat."

Each embedding-updating node then updates the embeddings associated with the training example under consideration based on an extent to which its prediction agrees or disagrees with the ground truth information. It can perform this task using different approaches, such as stochastic gradient descent (SGD), optionally with momentum. In one implementation, the embedding-updating node uses logistic loss in its training, although it can use other kinds of loss functions in other implementations. Momentum-related parameter values (if used) are discarded once training is complete and are not used in the inference-stage environment 104.

For example, assume that the prediction generated by the embedding-updating node B1 indicates that item D1 is not a good match for "funny video of cat," when it is known that it is in fact a good match. In response the embedding-updating node B1 will adjust the embeddings associated with the training example to penalize its inaccurate prediction. If the prediction indicates that the item D1 is a good match, the embedding-updating node B1 will adjust the embeddings associated with the training example to further bolster the prediction it has made. In the terminology used herein, each embedding-updating node produces a set of local token embeddings. For example, the embedding-updating node B1 produces a set of updated embeddings for the tokens "funny," "video," "of," "cat," and "D1." The embeddings are referred to as "local" because they reflect insight gleaned from predictions made by just the embedding-updating node B1, and do not yet reflect insight harvested from other embedding-updating nodes (e.g., B2 and B3) that operate in parallel with the embedding-updating node B1. Nor do the predictions made by the embedding-updating node B1 depend on predictions made by other embedding-updating nodes, or require communication with these other embedding-updating nodes. This is true even when different embedding-updating nodes are implemented by the same computing device, and even when different embedding-updating nodes process queries that include at least one common token (e.g., the word "funny").

In operation 408, the training framework 108 distributes the local token embeddings to appropriate embedding-consolidating nodes (C1, C2, C3, C4). The training framework 108 can perform this task in the manner described above, e.g., by hashing each token to produce a key, and then using the key to send the local token embeddings associated with that token to an appropriate embedding-consolidating node. Note that a conventional machine-training platform may operate by adjusting gradients for each iteration, whereas the training framework 108 actually moves local embeddings among separate processing nodes.

In operation 410, each embedding-consolidating node combines one or more instances of local token embeddings for each token that it handles. For instance, the embedding-consolidating node C1 receives a local token embedding from the embedding-updating node B1 for the word "funny." It also receives a local token embedding from the embedding-updating node B3 for the same word "funny." It then averages these two vectors on a dimension-by-dimension basis to produce a consolidated token embedding for the token "embedding."

In operation 412, the training framework 108 distributes the consolidated token embeddings produced in operation 410 to embedding-updating nodes that will need them to perform subsequent operations. For example, assume that the embedding-updating node B1 will next process another training example having a query that contains the word "funny." In response, the training framework 108 will send the consolidated token embedding for the word "funny" to this embedding-updating node B1. When performing a next updating operation, the embedding-updating node B1 will rely on the consolidated token embedding for the word "funny," along with other consolidated token embeddings received from one or more other embedding-consolidating nodes. Operation 412 also implies that the embedding-updating nodes can host different subsets of a complete set of embeddings. For instance, the different embedding-updating nodes can host different embeddings associated with different subsets of words within an entire vocabulary of words.

In operation 414, the training framework 108 repeats the operations 406 to 412 one or more times until a training objective is achieved. For instance, the training framework 108 can repeat the above operations 406 to 412 until the trained embeddings produce a level of predictive accuracy that satisfies a prescribed threshold value.

Figure 5:
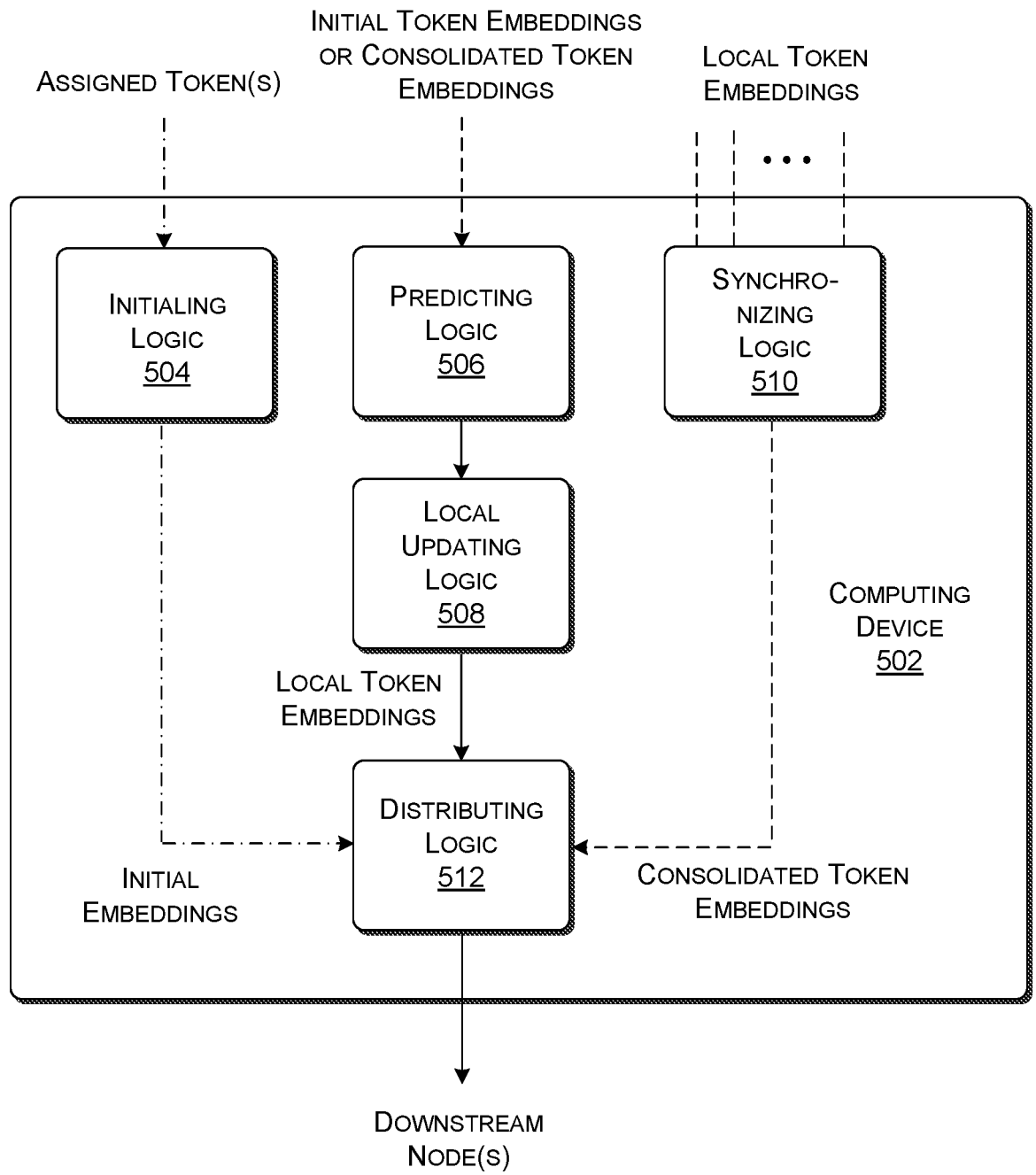
FIG. 5 shows an example of processing logic used in a computing device within the training framework of FIGS. 1 and 3.

FIG. 5 shows an example of processing logic used in an illustrative computing device 502 within the training framework 108 of FIGS. 1 and 3. In this case, the assumption is that this single computing device 502 can perform the roles associated with an embedding-initializing node, an embedding-updating node, and an embedding-consolidating node. In other implementations, a computing device can perform a subset of functions supported by the training framework 108, but not all of the functions.

Initializing logic 504 produces an initial embedding for each token assigned to the computing device 502. The initializing logic 504 can perform this task by using the same predetermined initial embedding for all tokens. Alternatively, the initializing logic 504 can map a received token to the initial embedding using any mapping function, such as a pre-trained neural network, a lookup table, etc.

Prediction logic 506 generates a prediction for a given training example x that includes a given query and a given item identifier. In one implementation, the prediction logic 506 relies on the following training-stage prediction function to generate a prediction $\hat{y}(x)$:

$$\hat{y}(x) = w_0 + \sum_{i=0}^{n} w_i x_i + \sum_{i=1}^{n} \sum_{j=i+1}^{n} \langle v_i, v_j \rangle x_i x_j. \tag{1}$$

In this equation, $x_i$ refers to each token that makes up the training example x. The tokens include the query tokens that make up the query and a single item token that provides an item identifier. The symbol $w_0$ is a global bias parameter, and each $w_i$ is a weighting parameter applied to each token $x_i$ under consideration in the training example x, and may be referred to as a local bias parameter. The global bias parameter $w_0$ is a shared parameter that can be optionally omitted in the training process to eliminate dependences among parallel processes performed by the nodes of the distributed training framework 108. More specifically, the global bias parameter can be omitted because its omission does not negatively affect the quality of the trained embeddings, and it is not used in at least some inference-stage engines that use the trained embeddings. Eliminating the global bias parameter in training provides gains in efficiency because, if it was included, a global bias parameter value would have to be averaged across every sample in the dataset for every iteration. Nevertheless, in other implementations, the global bias parameter is included in training in those cases in which a downstream inference-stage task is used that relies on it.

The symbol $v_i$ refers an embedding of size k associated with a token $x_i$. The symbol $v_j$ refers another embedding of size k associated with a token $x_j$. The term $\langle v_i, v_j \rangle$ refers to the dot product of embeddings $v_i$ and $v_j$ associated with a token $x_i$ and a token $x_j$, e.g., $\sum_{f=1}^{k} v_{i,f} v_{j,f}$. As a whole, Equation (1) can be generalized as a function F that maps the embedding vectors associated with an example to a prediction that indicates whether a query specified in the training example is a good match for an item identifier specified in the training example. Although not represented by Equation (1), the prediction logic 506 can optionally pass the output of Equation (1) through an activation function, such as a sigmoid function (which is appropriate for the case of binary classification).

Although not mentioned in the description of FIGS. 3 and 4, the embedding-updating nodes also calculate local bias parameter values ($w_i$) for the tokens that they handle, and send them to appropriate embedding-consolidating nodes. Each embedding-consolidating node that receives plural instances of these local bias parameter values for a particular token can then average them to produce a consolidated local bias parameter value. That embedding-consolidating node can then disseminate the consolidated local bias parameter value to selected embedding-updated nodes. For example, assume that two embedding-updating nodes process the word "funny." They will produce two local versions of the embedding for this word and two local versions of the local bias parameter value for this word. They will send this information to the same embedding-consolidating node. The embedding consolidating node will then average the two local embeddings for "funny" to produce a consolidating embedding for "funny," and average the two local bias parameter values for "funny" to produce a consolidated local bias parameter value for "funny." The embedding-consolidating node will then send this consolidated information out to any embedding-updating node that needs this information to perform updating operations in subsequent training cycles.

In other implementations, however, the local bias parameter values are not used in the training and inference stages, and therefore the second term of Equation (1) may be entirely omitted, and the processing associated therewith can be eliminated. Even if included, an inference-stage engine need not utilize local bias parameter values (although it also optionally could).

The local updating logic 508 uses stochastic gradient descent or some other iterative training algorithm to update the embeddings, to produce local token embeddings. In one implementation, the local updating logic 508 can perform this operation using the equation:

$$\frac{\partial}{\partial \theta} \hat{y}(x) = \begin{cases} 1, & \text{if } \theta \text{ is } w_0 \\ x_i, & \text{if } \theta \text{ is } w_i \\ x_i \sum_{j=1}^{n} v_{j,f} x_j - v_{i,f} x_i^2, & \text{if } \theta \text{ is } v_{i,f} \end{cases} \qquad (2)$$

Synchronizing logic 510 consolidates two or more embeddings for a word using any consolidating function. In one case, the synchronizing logic 510 consolidates embeddings by averaging the embeddings on an element-by-element basis. For example, if there are three embeddings for the word "video," the synchronizing logic 510 generated the first element of a consolidated embedding by adding the three values in the first element of the three vectors, and dividing by three.

Distribution logic 512 sends output generated by the computing device to one more downstream components. In one context, the output corresponds to one or more initial embeddings. In another context, the output corresponds to a set of local token embeddings. In another case, the output corresponds to one or more global token embeddings.

Figure 6:
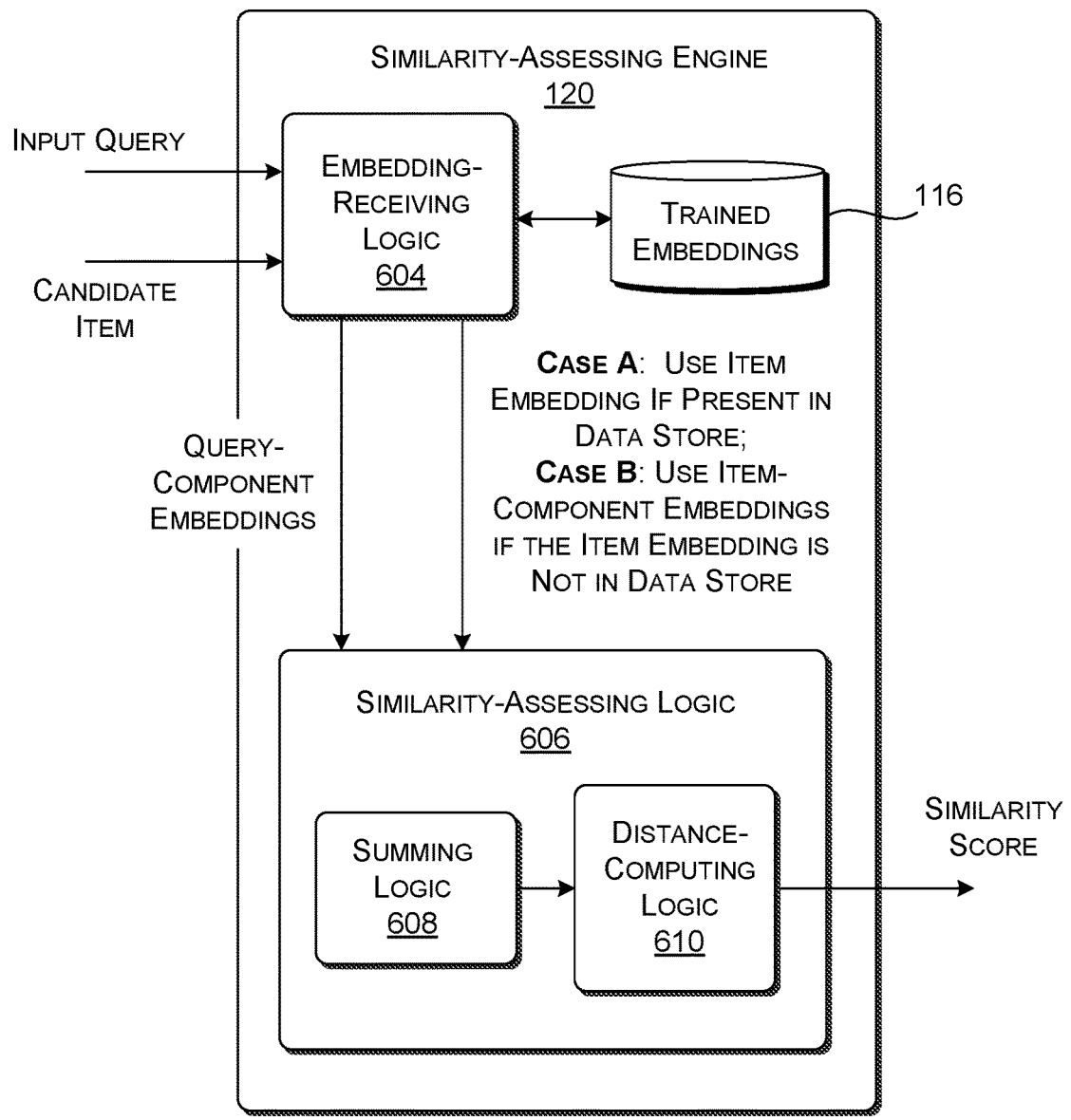
FIG. 6 shows one implementation of a similarity-assessing engine that is used to determine the relevance of a query to a candidate item. The similarity-assessing engine is one element of the inference-stage environment of FIG. 1.

FIG. 6 shows a similarity-assessing engine 602 that represents one implementation of the inference-stage similarity-assessing engine 120 introduced above in connection with the explanation of FIG. 1. Assume that the similarity-assessing engine 602 is currently performing the task of determining whether a candidate item is a good matched for a submitted query. The similarity-assessing engine 602 can receive the query from a user computing device 122 or some other mechanism. The similarity-assessing engine 602 can receive an item identifier that identifies the candidate item from the search engine 110 or any other context-specific query-processing functionality. Embedding-receiving logic 604 then retrieves trained embeddings from the data store 116 associated with this input information, where such trained embeddings have been previously generated by the training framework 108. More specifically, the embedding-receiving logic 604 can retrieve a query-component embedding $Q_i$ associated with each token (e.g., each word) of the query. The embedding-receiving logic 604 can also retrieve an item embedding d associated with the item identifier.

Similarity-assessing logic 606 generates a similarity score s based on the above-described trained embeddings. For instance, summing logic 608 can first generate a single query embedding q based on all the |Q| query-component embeddings $Q_i$ in the input query:

$$q = \sum_{i=0}^{|Q|} Q_i. \qquad (3)$$

Distance-computing logic 610 next determines the similarity score s using cosine similarity or any other distance metric. For cosine similarity, the similarity score s is given by:

$$s = \frac{q \cdot d}{\|q\|\|d\|}. \qquad (4)$$

The training framework 108 produces the item embedding d that is used in Equation (4) by operating on training examples that include an item identifier d associated with a particular item. As explained above, the item identifier may correspond to a URL associated with the item. In other words, the training framework 108 treats the item identifier d itself as a token without taking into consideration the contents of the item.

Overall, note that the training framework performs a prediction using Equation (1), while the similarity-assessing engine 120 performs a prediction using Equations (3) and (4). This provides one concrete example of how the similarity-assessing engine leverages the trained embeddings produced by the training framework 108, but need not use the same prediction function as the training framework 108. In other words, the prediction function applied by the training framework 108 can be considered a proxy of one or more other prediction functions applied by the interference-stage processing.

Figure 7:
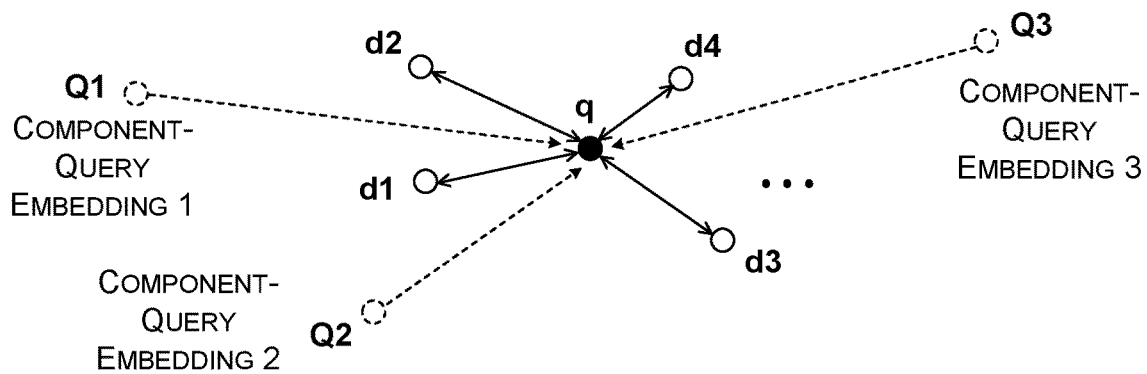
FIG. 7 demonstrates the operation of the similarity-assessing engine of FIG. 6 by showing embeddings in a vector space.

FIG. 7 graphically illustrates the operation of the similarity-assessing engine 602 with respect to a set of vectors in a vector space. (Note that the vector space is illustrated in two dimensions only to facilitate explanation; the vector space actually has k dimensions.) The query embedding q has a placement in the vector space that is determined by the sum of the query-component embeddings $Q_i$ associated with the tokens that make up the query. Thus, the query embedding q can be expected to lie somewhere within a cluster of points defined by the query component embeddings $Q_i$. The distance-computing logic 610 determines the distance of each item embedding $d_i$ to the query embedding. Item embeddings that lie closest to the query embedding q can be expected to be the most relevant to the query embedding q.

In another implementation, the summing logic 608 can use the Equation (3) to compute the item embedding d based on the title, that is, by replacing $Q_i$ with $T_i$, where $T_i$ refers an item-component embedding associated with a token (e.g., a word) that appears in the title of the item. Alternatively, or in addition, the summing logic 608 can add embeddings associated with tokens in some other identified part of the item, such as its abstract or keyword section, etc. In one implementation, the training framework 108 nevertheless operates in the same manner described above, without taking into account of the content of any item. In other words, the training framework 108 performs analysis on the identifier associated with items, not their internal tokens.

In a third case, the similarity-assessing engine 120 provides a hybrid model. The hybrid model applies Equations (3) and (4) if the data store 116 includes an item embedding for the candidate item under consideration, where, again, the item embedding represents a transformation of the item's identifier, not its internal contents. However, if the item embedding is not available in the data store 116, the hybrid model generates a synthetic item embedding d in the manner described above by summing together the item-component embeddings associated with the tokens in the item's title or some other part. The hybrid model can apply a discounting factor to the similarity score when the second option is used, which has the effect of lowering the similarity score. This reflects the fact that a similarity score generated based on the words in an item's title may be less reliable than a similarity score generated based on an item embedding contained in the data store 116. This is because each item embedding in the data store 116 derives from evidence regarding a user's click behavior directed a particular item.

Figure 8:
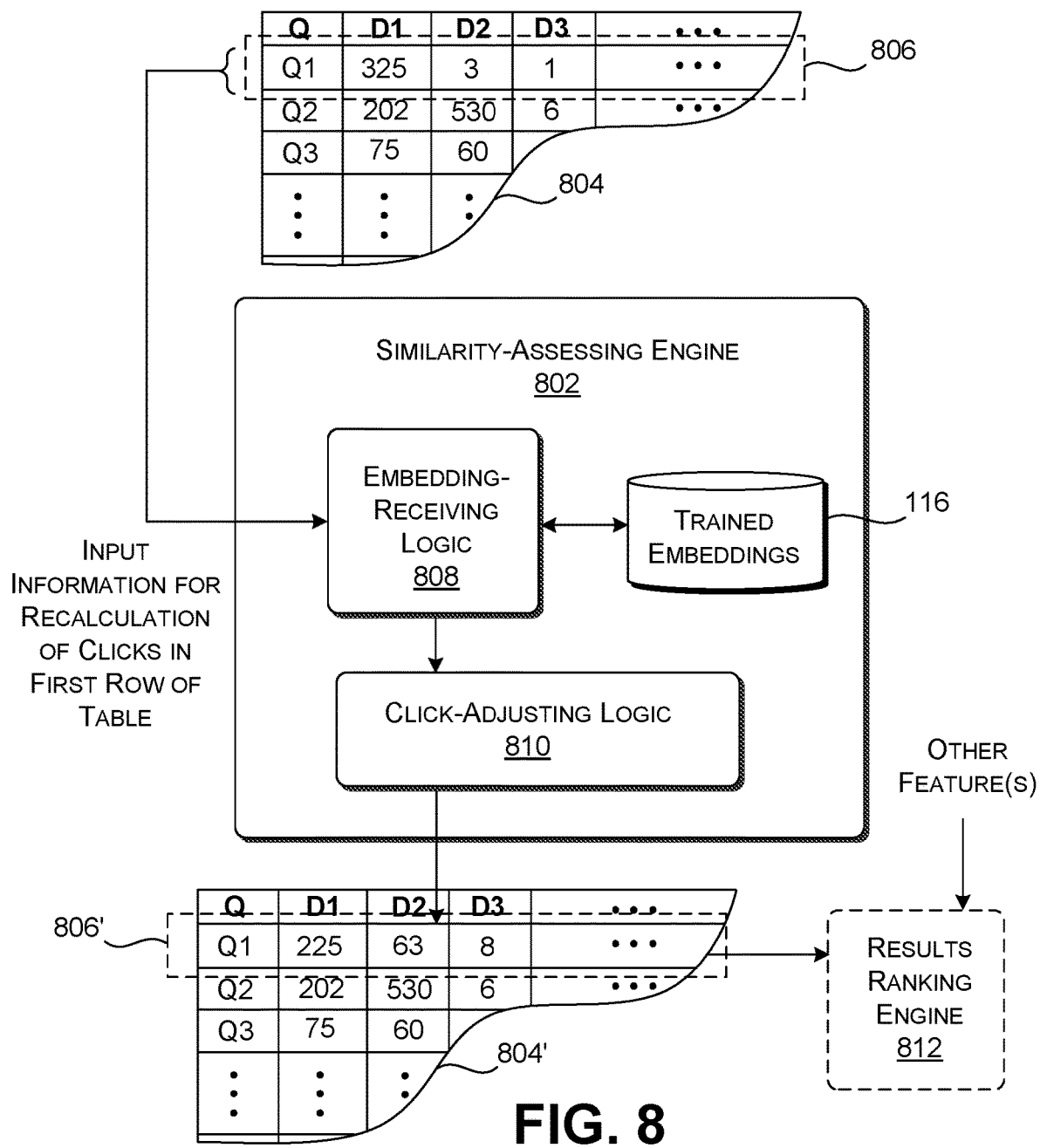
FIG. 8 shows an implementation of the similarity-assessing engine of FIG. 1 that is used to adjust the click counts associated with items.

FIG. 8 shows a similarity-assessing engine 802 that represents another implementation of the similarity-assessing engine 120 introduced in the context of the explanation of FIG. 1. The goal of the similarity-assessing engine 802 is to adjust the number of clicks that a target item $d_j$ receives based on the number of clicks at least one other item ($d_i$) has received, with respect to the submission of a same query q. The amount of clicks that the other item $d_i$ "contributes" to the target item $d_j$ is determined, in turn, by identifying an item embedding $v_j$ associated with the target item, identifying an item embedding $v_i$ associated with the other item, and then determining a relation of these two embeddings ($v_j$, $v_i$) in the vector space, e.g., using cosine similarity or any other distance metric.

More specifically, FIG. 8 shows an example in which a table 804 or other data structure in memory stores a list of queries submitted by users, together with information regarding a number of times that users have clicked on these items. For example, a first row 806 of the table indicates that users clicked on a first item D1 a total of 325 times after submitting the query Q1. Users clicked on a second item D2 a total of only 3 times upon submitting the same query Q1. Note that an actual table may present this click information in any form, such as normalized click-through-rate (CTR) information; FIG. 8 shows an example that provides raw click information only to facilitate explanation.

The disparity between the number of clicks that items D1 and D2 have received can represent a problem in some contexts. For instance, consider the case in which the search engine 110 presents a search results page that includes a list of matching items when the user enters the query Q1. Further assume the search engine 110 displays an entry for item D1 at the top of this list because it is determined to be the most relevant item to the user's query Q1. Upon being served this search results page, most users can be expected to click on the entry for item D1. Presuming that this item satisfies their search objective, most users can further be expected to terminate their search at this stage. This may prevent the users from discovering that the entry for item D2, which occurs farther down in the list, is also relevant to his or her search objectives. The search engine 110 is unlikely to elevate the placement of the item D2 in the list over time because few users click on it. On the other hand, the search engine 110 will likely strengthen its conclusion that the item D1 is relevant because many users continue to click on it. This has the effect of effectively trapping the item D2 in its unfavorable placement within the list, even though it may offer information that is as valuable as the item D1. The similarity-assessing engine 602 works in this situation to elevate the number of clicks that the item D2 is considered to have received upon reaching the conclusion that the item D2 is sufficiently related to the item D1 and therefore is likely to also satisfy the user's search objective. By elevating the number of clicks that the item D2 receives, the search engine 110 may respond by elevating its entry in a search results page. This behavior facilitates the ability of users to discover relevant items.

More specifically, embedding-receiving logic 808 receives input information from the table 804. With respect to the first row 806, the input information includes information that identifies the query Q1, the items (D1, D2, D3, . . . ) that users selected in response to the query Q1, and the original click information. The click information is referred to as "original" because it reflects actual selections made by users. The embedding-receiving logic 808 then retrieves embeddings associated with the query Q1 and each of the items (D1, D2, D3, . . . ). More specifically, in one implementation, the embedding-receiving logic 808 retrieves the same kind of embeddings described above that are produced by the training framework 108. Recall that the training framework 108 produces the embeddings by operating on a corpus of training examples that includes pairings of queries and item identifiers. The item identifiers may correspond to URLs. In addition, or alternatively, the training framework 108 may produce an embedding for an item by identifying a set of tokens associated with the item (such as the words that compose its title), identifying item-component embeddings associated with those tokens, and summing those item-component embeddings in the manner described above.

In yet other implementations, the embedding-receiving logic 808 retrieves embeddings provided by some source other than the training framework 108. For instance, the embedding-receiving logic 808 can retrieve embeddings produced in advance by a deep neural network (DNN) of any type, such as a convolutional neural network (CNN). In some cases, this kind of DNN can map tokens associated with an item into an embedding. In yet another case, the embedding-receiving logic 808 relies on an algorithm to dynamically compute the embeddings when requested, that is, rather than computing and storing the embeddings in advance.

Click-adjusting logic 810 adjusts the click information in the first row 806 of the original table 804 to produce a modified row 806' of a modified table 804'. In one non-limiting approach, the click-adjusting logic 810 adjusts the number of clicks that a target item $d_j$ in the first row 806 receives using the following equation:

$$c_{d_j}^c = \sum_{i=1}^{|D|} c_{d_i}^o \cdot f(v_j, v_i). \quad (5)$$

The symbol $c_{d_j}^c$ refers to the number of clicks that item $d_j$ receives, where the superscript "c" indicates that these are conditional or proxy or virtual clicks. The symbol $c_{d_j}^o$ refers to the actual number of clicks that another item $d_i$ in the first row 806 receives, where the superscript "o" indicates that these clicks or actual or original clicks. The term $f(v_j, v_i)$ refers to any function that measures the similarity between the embeddings $(v_j, v_i)$ associated with the two items under consideration. In one non-limiting case, this function may correspond to cosine similarity. Although not shown, the click-adjusting logic 810 can normalize the click information produced by Equation (5) in any manner, such as by dividing click information by the average number of clicks in the row 806, or the entire table 804, etc.

Consider the application of the above equation to the number of clicks that item D2 receives in the first row 806. The click-adjusting logic 810 can determine the relation of this item D2 to every other item in the first row 806. The click-adjusting logic 810 boosts the click count of the item D2 by a weighted sum of the click counts associated with the other items, where the weight associated with each contribution is determined by the function $f(v_j, v_i)$. In the merely illustrative example of FIG. 8, this has the net effect of boosting the click count for the item D2 from 3 clicks to 63 clicks.

An optional downstream ranking engine 812 can rank items or perform any other processing on items based on the revised count information in the table 804' and/or based on any other features associated with the items and the environment in which the items are being accessed, such as lexical features, semantic features, contextual features, etc.

Figure 9:
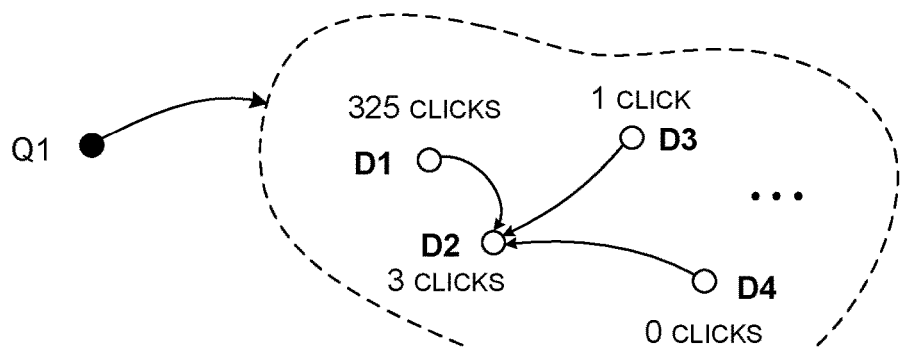
FIG. 9 demonstrates the operation of the similarity-assessing engine of FIG. 8 by showing embeddings in a vector space.

FIG. 9 illustrates the above scenario with respect to the placement of embeddings in vector space. The distance of each item embedding from item D2's embedding governs the relative amount of clicks it will contribute to item D2's revised click count. For instance, the embedding associated with item D1 is closest to the embedding associated with item D2. Further, the item D1 has a relatively large click count compared to the other items in the first row 806. These two factors make it likely that the item D1 will contribute the greatest number of click counts to the item D2. On the other hand, when Equation (5) is repeated for the case in which item D1 is the target item, the click-adjusting logic 810 can be expected to lower the number of clicks that item D1 is considered to have received. Overall, the click-adjusting logic 810 has the effect of balancing the number of clicks that a set of closely-related items receive, based on the premise that they are similar and therefore deserve similar click counts.

B. Illustrative Processes

Figure 11:
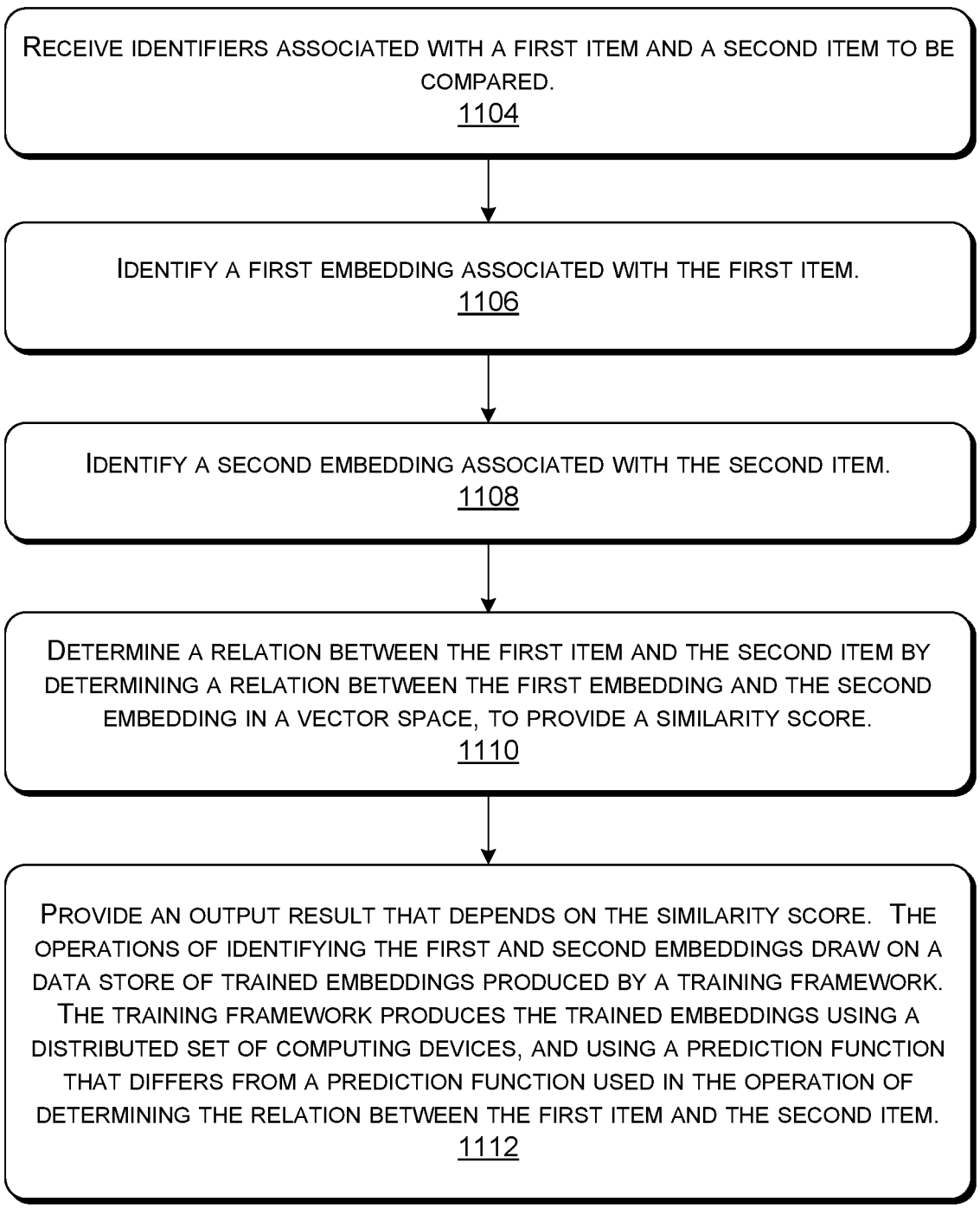
FIG. 11 shows a process that provides an overview of one manner of operation of the similarity-assessing engine of FIGS. 1, 6 and 8.
Figure 12:
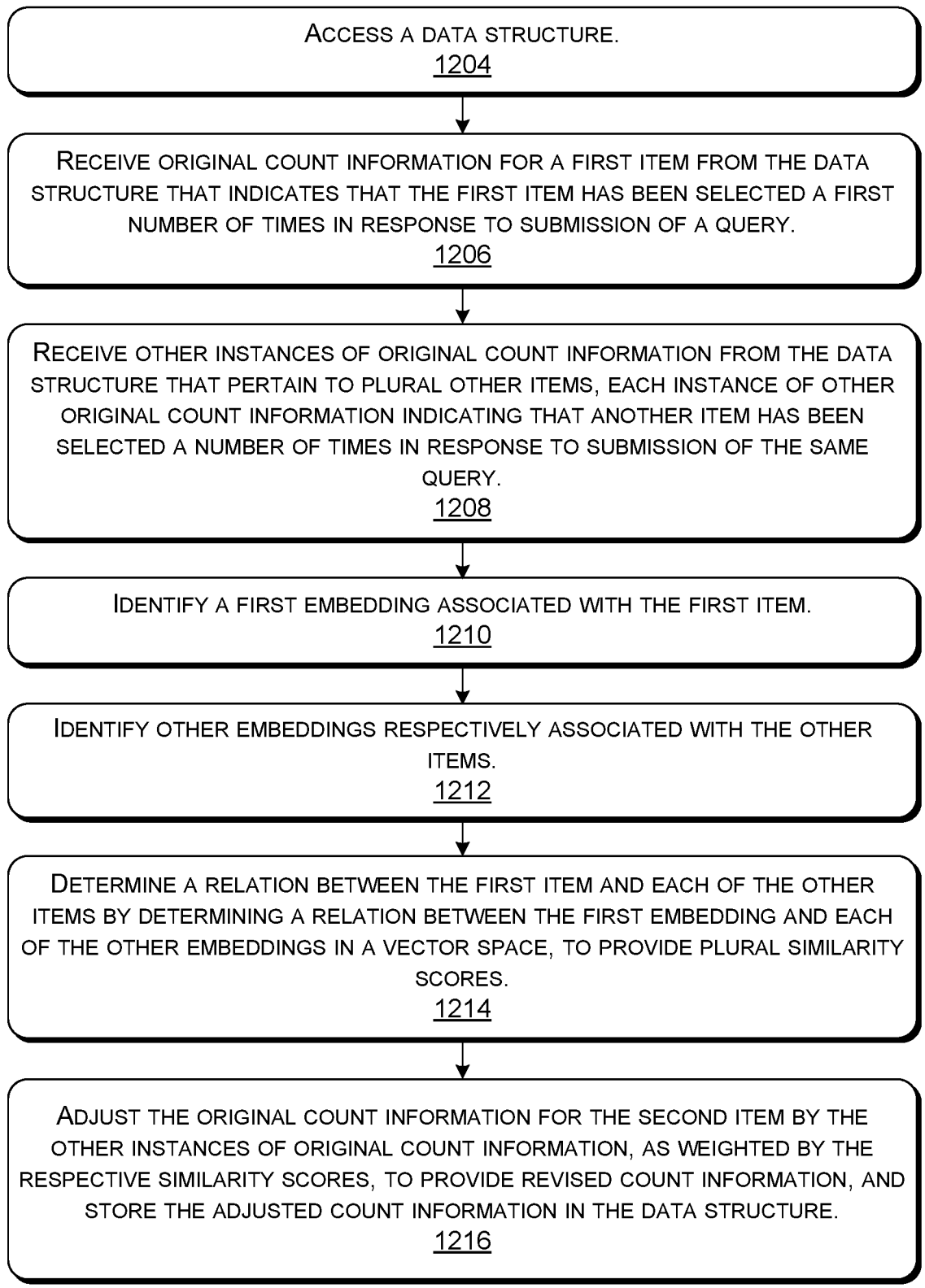
FIG. 12 shows a process that provides an overview of the particular similarity-assessing engine of FIG. 8. This similarity-assessing engine adjusts click count information in a data structure.

FIGS. 10-12 show processes that explain the operation of the training-stage environment 102 and the inference-stage environment 104 of Section A in flowchart form. Since the principles underlying the operation of these environments (102, 104) have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 10 shows a process 1002 that provides an overview of one manner of operation of the training-stage environment 102 of FIG. 1. In block 1004, the training-stage environment 102 provides a set of training examples, each of which describes a query submitted by at least one user, an item, and an indication of whether the item has been selected by the at least one user in response to submitting the query. In block 1006, the training-stage environment 102 provides initial token embeddings associated with different training examples to plural respective embedding-updating computing devices. The training-stage environment 102 next commences a loop which it repeats a plurality of times until a training objective is achieved. In block 1008 of the loop, the training-stage environment 102 uses the plural embedding-updating computing devices 304 to generate plural sets of local token embeddings. In block 1010 of the loop, the training-stage environment 102 provides the plural sets of local token embeddings to plural embedding-consolidating computing devices 306. In block 1012 of the loop, the training-stage environment 102 uses the plural embedding-consolidating computing devices to generate plural consolidated token embeddings from the plural sets of local token embeddings; each consolidated token embedding for a particular token represents a consolidation of one or more local token embeddings for the particular token. In block 1014 of the loop, the training-stage environment 102 provides the plural consolidated token embeddings to selected embedding-updating computing devices. Operation 1016 indicates that the loop repeats at least one time until the training objective is achieved.

FIG. 11 shows a process 1102 that provides an overview of one manner of operation of the similarity-assessing engine 120 of FIG. 1. In block 1104, the similarity-assessing engine 120 receives identifiers associated with a first item and a second item to be compared. In block 1106, the similarity-assessing engine 120 identifies a first embedding associated with the first item. In block 1108, the similarity-assessing engine 120 identifies a second embedding associated with the second item. In block 1110, the similarity-assessing engine 120 determines a relation between the first item and the second item by determining a relation between the first embedding and the second embedding in a vector space, to provide a similarity score. In block 1112, the similarity-assessing engine provides an output result that depends on the similarity score. The operations of identifying the first and second embeddings in blocks 1106 and 1108 draw on a data store 116 of trained embeddings produced by a training framework 108. The training framework 108 produces the trained embeddings using a distributed set of computing devices 118, and using a prediction function that differs from a prediction function used in the operation of determining the relation between the first item and the second item.

In the context of the similarity-assessing engine 602 shown in FIG. 6, the above-mentioned first item is a query submitted by a user via the user computing device 122. The second item is a candidate item under consideration. The operation of identifying in block 1106 involves identifying a query embedding associated with one or more tokens of the query. The operation of identifying in block 1108 involves identifying an item embedding associated with the candidate item. The operation of determining in block 1110 involves determining a distance between the query embedding and the item embedding, the distance corresponding to the similarity score. The operation of providing in block 1112 involves sending search results to the user computing device 112 that identifies a relationship of the candidate item to the query.

In the context of the similarity-assessing engine 802 of FIG. 8, the first item is an item selected by at least one user a first number of times, as reflected by first original count information. The second item is an item selected by at least one user a second number of times, as reflected by second original count information, the second number of times differing from the first number of times. The process 1102 further involves adjusting the count information for the second item by the count information for the first item, as weighted by the similarity score, to provide revised count information.

FIG. 12 shows a process 1202 that describes one manner of operation of the particular similarity-assessing engine 802 of FIG. 8. This process 1202 has the effect of adjusting the number of clicks one or more documents receive. In block 1204, the similarity-assessing engine 802 accesses a data structure, such as the table 804 shown in FIG. 4. In block 1206, the similarity-assessing engine 802 receive original count information for a first item from the data structure that indicates that the first item has been selected a first number of times in response to submission of a query. In block 1208, the similarity-assessing engine 802 receives other instances of original count information from the data structure that pertain to plural other items, each instance of other original count information indicating that another item has been selected a number of times in response to submission of the same query. In block 1210, the similarity-assessing engine 802 identifies a first embedding associated with the first item. In block 1212, the similarity-assessing engine 802 identifies other embeddings respectively associated with the other items. In block 1214, the similarity-assessing engine 802 determines a relation between the first item and each of the other items by determining a relation between the first embedding and each of the other embeddings in a vector space, to provide plural similarity scores. In block 1216, the similarity-assessing engine 802 adjusts the original count information for the second item by the other instances of original count information, as weighted by the respective similarity scores, to provide revised count information. The similarity-assessing engine 802 then stores the adjusted count information in the data structure.

C. Representative Computing Functionality

Figure 13:
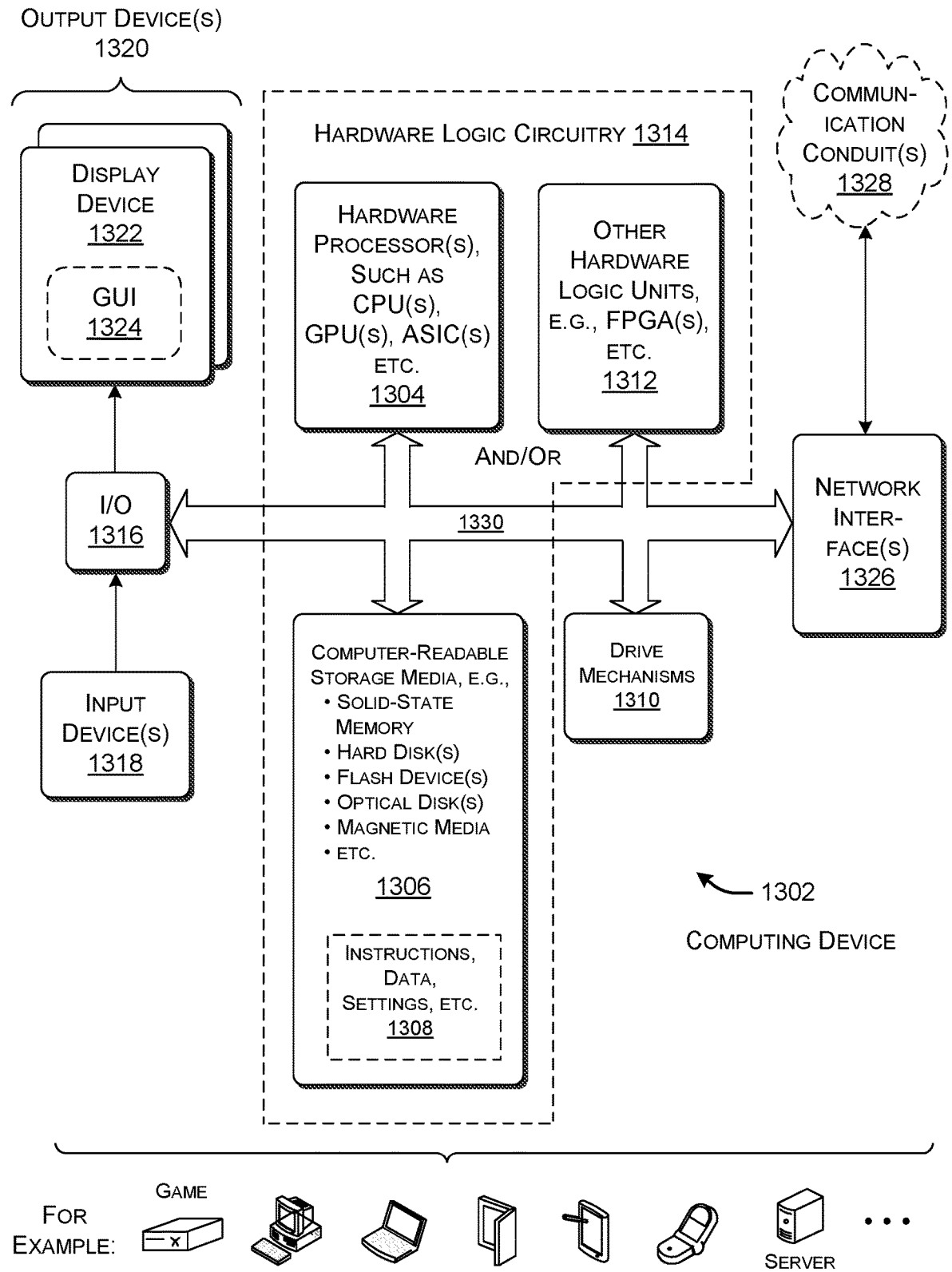
FIG. 13 shows an illustrative type of computing device that can be used to implement any aspect of the features shown in the foregoing drawings.

FIG. 13 shows a computing device 1302 that can be used to implement any aspect of the mechanisms set forth in the above-described figures. For instance, with reference to FIG. 1, the type of computing device 1302 shown in FIG. 13 can be used to implement any user computing device or any server. In all cases, the computing device 1302 represents a physical and tangible processing mechanism.

The computing device 1302 can include one or more hardware processors 1304. The hardware processor(s) 1304 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1302 can also include computer-readable storage media 1306, corresponding to one or more computer-readable media hardware units. The computer-readable storage media 1306 retains any kind of information 1308, such as machine-readable instructions, settings, data, etc. Without limitation, for instance, the computer-readable storage media 1306 may include one or more solid-state devices, one or more magnetic hard disks, one or more optical disks, magnetic tape, and so on. Any instance of the computer-readable storage media 1306 can use any technology for storing and retrieving information. Further, any instance of the computer-readable storage media 1306 may represent a fixed or removable unit of the computing device 1302. Further, any instance of the computer-readable storage media 1306 may provide volatile or non-volatile retention of information.

The computing device 1302 can utilize any instance of the computer-readable storage media 1306 in different ways. For example, any instance of the computer-readable storage media 1306 may represent a hardware memory unit (such as Random Access Memory (RAM)) for storing transient information during execution of a program by the computing device 1302, and/or a hardware storage unit (such as a hard disk) for retaining/archiving information on a more permanent basis. In the latter case, the computing device 1302 also includes one or more drive mechanisms 1310 (such as a hard drive mechanism) for storing and retrieving information from an instance of the computer-readable storage media 1306.

The computing device 1302 may perform any of the functions described above when the hardware processor(s) 1304 carry out computer-readable instructions stored in any instance of the computer-readable storage media 1306. For instance, the computing device 1302 may carry out computer-readable instructions to perform each block of the processes described in Section B.

Alternatively, or in addition, the computing device 1302 may rely on one or more other hardware logic units 1312 to perform operations using a task-specific collection of logic gates. For instance, the hardware logic unit(s) 1312 may include a fixed configuration of hardware logic gates, e.g., that are created and set at the time of manufacture, and thereafter unalterable. Alternatively, or in addition, the other hardware logic unit(s) 1312 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 13 generally indicates that hardware logic circuitry 1314 includes any combination of the hardware processor(s) 1304, the computer-readable storage media 1306, and/or the other hardware logic unit(s) 1312. That is, the computing device 1302 can employ any combination of the hardware processor(s) 1304 that execute machine-readable instructions provided in the computer-readable storage media 1306, and/or one or more other hardware logic unit(s) 1312 that perform operations using a fixed and/or programmable collection of hardware logic gates. More generally stated, the hardware logic circuitry 1314 corresponds to one or more hardware logic units of any type(s) that perform operations based on logic stored in and/or otherwise embodied in the hardware logic unit(s).

In some cases (e.g., in the case in which the computing device 1302 represents a user computing device), the computing device 1302 also includes an input/output interface 1316 for receiving various inputs (via input devices 1318), and for providing various outputs (via output devices 1320). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1322 and an associated graphical user interface presentation (GUI) 1324. The display device 1322 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1302 can also include one or more network interfaces 1326 for exchanging data with other devices via one or more communication conduits 1328. One or more communication buses 1330 communicatively couple the above-described units together.

The communication conduit(s) 1328 can be implemented in any manner, e.g., by a local area computer network, a wide area computer network (e.g., the Internet), point-to-point connections, etc., or any combination thereof. The communication conduit(s) 1328 can include any combination of hardwired links, wireless links, routers, gateway functionality, name servers, etc., governed by any protocol or combination of protocols.

FIG. 13 shows the computing device 1302 as being composed of a discrete collection of separate units. In some cases, the collection of units may correspond to discrete hardware units provided in a computing device chassis having any form factor. FIG. 13 shows illustrative form factors in its bottom portion. In other cases, the computing device 1302 can include a hardware logic unit that integrates the functions of two or more of the units shown in FIG. 1. For instance, the computing device 1302 can include a system on a chip (SoC or SOC), corresponding to an integrated circuit that combines the functions of two or more of the units shown in FIG. 13.

The following summary provides a non-exhaustive set of illustrative examples of the technology set forth herein.

According to a first example, a computer-implemented method is described for producing a set of trained embeddings. The method includes providing a set of training examples, each training example describing a query submitted by at least one user, an item, and an indication of whether the item has been selected by the at least one user in response to submitting the query. The method further includes providing initial token embeddings associated with different training examples to plural respective embedding-updating computing devices. The method then performs an iteration of a training loop that includes: using the plural embedding-updating computing devices to generate plural sets of local token embeddings; providing the plural sets of local token embeddings to plural embedding-consolidating computing devices; using the plural embedding-consolidating computing devices to generate plural consolidated token embeddings from the plural sets of local token embeddings, each consolidated token embedding for a particular token representing a consolidation of one or more local token embeddings for the particular token; and providing the plural consolidated token embeddings to selected embedding-updating computing devices. The method further includes repeating the training loop until a training objective is achieved, at which point the plural consolidated token embeddings provided to the embedding-updating computing devices correspond to the set of trained embeddings.

According to a second example, at least one of the plural embedding-updating computing devices is a same computing device as an embedding-consolidating computing device.

According to a third example, each particular training example expresses a particular query using one or more query tokens, wherein each query token is expressed as a query token vector that has a dimensionality as large as a number of query tokens in a vocabulary of query tokens.

According to a fourth example, each particular training example expresses a particular item using an item vector that has a dimensionality as large as a number of items in a set of selectable items.

According to a fifth example, each embedding-updating computing device generates a set of local token embeddings by: for a particular training example that identifies a particular query and a particular item, generating a prediction that indicates whether the particular query is deemed similar to the particular item; and updating a set of local token embeddings based on an indication of whether the prediction agrees with a particular label associated with the particular training example. Each embedding-updating computing device performs a process that relies on no more than one global parameter value that is shared with processes performed by other embedding-updating computing devices.

According to a sixth example, the particular consolidated token embedding for the particular token is produced by averaging together two or more local token embeddings for the particular token.

According to a seventh example, the operation of providing of plural consolidated token embeddings to selected embedding-updating computing devices involves sending a given consolidated token embedding associated with a given token to each embedding-updating computing device that has been assigned at least one training example that includes the given token.

According to an eighth example, relating to the seventh example, an embedding-updating computing device that has not been assigned at least one training example that includes the given token does not receive the given consolidated token embedding.

According to a ninth example, the trained embeddings are used in an inference-stage process to determine a similarity score that measures a level of similarity between a query submitted by a user and a candidate item.

According to a tenth example, the trained embeddings are used in an inference-stage process, and wherein the inference-stage process uses a prediction function that differs from a prediction function used in the training loop to generate the plural sets of local token embeddings.

According to an eleventh example, a computer-implemented method is described for determining a relation among two or more items. The method includes: receiving identifiers associated with a first item and a second item to be compared; identifying a first embedding associated with the first item; identifying a second embedding associated with the second item; determining a relation between the first item and the second item by determining a relation between the first embedding and the second embedding in a vector space, to provide a similarity score; and providing an output result that depends on the similarity score. The operation of identifying a first embedding and identifying a second embedding draw on a data store of trained embeddings produced by a training framework. The training framework produces the trained embeddings using a distributed set of computing devices, and using a prediction function that differs from a prediction function used in the operation of determining the relation between the first item and the second item.

According to a twelfth example, relating to the eleventh example, the first item is a query submitted by a user via a user computing device. The second item is a candidate item under consideration. The operation of identifying the first embedding involves identifying a query embedding associated with one or more tokens of the query. The operation of identifying the second embedding involves identifying an item embedding associated with the candidate item. The operation of determining the relation involves determining a distance between the query embedding and the item embedding, the distance corresponding to the similarity score. The operation of providing the output result includes sending search results to the user computing device that identifies a relationship of the candidate item to the query.

According to a thirteenth example, relating to the twelfth example, the operation of identifying the query embedding includes: identifying plural query-component embeddings respectively associated with query tokens of the query; and summing the plural query-component embeddings to produce the query embedding.

According to a fourteenth example, relating to the twelfth example, the operation of identifying the item embedding includes retrieving a single item embedding from a data store that is associated with an item identifier that identifies the candidate item.

According to a fifteenth example, relating to the twelfth example, the operation of identifying the item embedding includes: identifying plural item-component embeddings respectively associated with tokens that form at least part of the candidate item; and summing the plural item-component embeddings to produce the item embedding.

According to a sixteenth example, relating to the fifteenth example, the item embedding is produced by summing the plural item-component embeddings upon a determination that there is no single item embedding in a data store that is associated with an item identifier that identifies the candidate item.

According to a seventeenth example, relating to the fifteenth example, the plural item-component embeddings describe respective words in a title associated with the candidate item.

According to an eighteenth example, relating to the eleventh example, the first item is an item selected by at least one user a first number of times, as described by first original count information associated with the first item. The second item is an item selected by the at least one user a second number of times, as reflected by second original count information associated with the second item, the second number of times differing from the first number of times. The computer-implemented method further includes generating revised count information for the second item based on the first original count information as weighted by the similarity score. The method includes storing the revised count information.

According to an nineteenth example, relating to the eighteenth example, the computer-implemented method further incudes adjusting a ranking of the second item in search results provided to a user relative to the first item based on the revised count information.

According to a twentieth example, a computer-readable storage medium for storing computer-readable instructions is described. The computer-readable instructions, when executed by one or more hardware processors, performs a method that includes: accessing a data structure; receiving original count information for a first item from the data structure that indicates that the first item has been selected a first number of times in response to submission of a query; receiving other instances of original count information from the data structure that pertain to plural other items, each instance of other original count information indicating that another item has been selected a number of times in response to submission of the same query; identifying a first embedding associated with the first item; identifying other embeddings respectively associated with the other items; determining a relation between the first item and each of the other items by determining a relation between the first embedding and each of the other embeddings in a vector space, to provide plural similarity scores; adjusting the original count information for the second item by the other instances of original count information, as weighted by the respective similarity scores, to provide revised count information; and storing the revised count information in the data structure.

According to a twenty-first example, the embeddings produced by the twentieth example are produced using the method described in the first example.

A twenty-second example corresponds to any combination (e.g., any logically consistent permutation or subset) of the above-referenced first through twenty-first examples.

A twenty-third example corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-second examples.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for producing a set of trained embeddings, comprising:
   providing a set of training examples, each training example describing a query submitted by at least one user, an item, and an indication of whether the item has been selected by said at least one user in response to submitting the query;
   providing initial token embeddings associated with different training examples to plural respective embedding-updating computing devices;

performing an iteration of a training loop that includes:
using the plural embedding-updating computing devices to generate plural sets of local token embeddings;
providing the plural sets of local token embeddings to plural embedding-consolidating computing devices;
using the plural embedding-consolidating computing devices to generate plural consolidated token embeddings from the plural sets of local token embeddings, a particular consolidated token embedding for a particular token representing a consolidation of two or more different local token embeddings computed by two or more respective embedding-updating computing devices for the same particular token; and
providing the plural consolidated token embeddings to selected embedding-updating computing devices for use by the selected embedding-updating computing devices in performing generation of local token embeddings in a next iteration of the training loop,
repeating the training loop until a training objective is achieved, at which point the plural consolidated token embeddings provided to the embedding-updating computing devices correspond to the set of trained embeddings.

2. The computer-implemented method of claim 1, wherein at least one of the plural embedding-updating computing devices is a same computing device as an embedding-consolidating computing device.

3. The computer-implemented method of claim 1, wherein each particular training example expresses a particular query using one or more query tokens, wherein each query token is expressed as a query token vector that has a dimensionality as large as a number of query tokens in a vocabulary of query tokens.

4. The computer-implemented method of claim 1, wherein each particular training example expresses a particular item using an item vector that has a dimensionality as large as a number of items in a set of selectable items.

5. The computer-implemented method claim 1, wherein each embedding-updating computing device generates a set of local token embeddings by:
for a particular training example that identifies a particular query and a particular item, generating a prediction that indicates whether the particular query is deemed similar to the particular item; and
updating a set of local token embeddings based on an indication of whether the prediction agrees with a particular label associated with the particular training example,
wherein each embedding-updating computing device performs a process that relies on no more than one global parameter value that is shared with processes performed by other embedding-updating computing devices.

6. The computer-implemented method of claim 1, wherein the particular consolidated token embedding for the particular token is produced by averaging together said two or more different local token embeddings for the same particular token.

7. The computer-implemented method of claim 1, wherein said providing of the plural consolidated token embeddings to selected embedding-updating computing devices involves sending a given consolidated token embedding associated with a given token to each embedding-updating computing device that has been assigned at least one training example that includes the given token.

8. The computer-implemented method of claim 7, wherein an embedding-updating computing device that has not been assigned at least one training example that includes the given token does not receive the given consolidated token embedding.

9. The computer-implemented method of claim 1, wherein the set of trained embeddings are used in an inference-stage process to determine a similarity score that measures a level of similarity between a query submitted by a user and a candidate item.

10. The computer-implemented method of claim 1, wherein the set of trained embeddings are used in an inference-stage process, and wherein the inference-stage process uses a prediction function that differs from a prediction function used in the training loop to generate the plural sets of local token embeddings.

11. A computing system having hardware logic circuitry configured to implement the computer-implemented method of claim 1.

12. A computer-readable storage medium for storing computer-readable instructions, one or more hardware processors executing the computer-readable instructions to perform the computer-implemented method of claim 1.

13. The computer-implemented method of claim 1, wherein, in the training loop, different embedding-updating computing devices of the plural embedding-updating computing devices store different respective subsets of a complete set of token embeddings.

14. A computer-implemented method for determining a relation among two or more items, comprising:
receiving identifiers associated with a first item and a second item to be compared;
identifying a first embedding associated with the first item;
identifying a second embedding associated with the second item;
determining a relation between the first item and the second item by determining a relation between the first embedding and the second embedding in a vector space, to provide a similarity score; and
providing an output result that depends on the similarity score,
said identifying a first embedding and identifying a second embedding drawing on a data store of trained embeddings produced by a training framework,
the training framework producing the trained embeddings using a distributed set of computing devices, and using a prediction function that differs from a prediction function used in said determining of the relation between the first item and the second item,
wherein the first item is a query submitted by a user via a user computing device,
wherein the second item is a candidate item under consideration,
wherein said identifying of the first embedding involves identifying a query embedding associated with one or more tokens of the query,
wherein said identifying of the second embedding involves identifying an item embedding associated with the candidate item,
wherein said determining of the relation involves determining a distance between the query embedding and the item embedding in the vector space, the distance corresponding to the similarity score, and
wherein said providing the output result includes sending search results to the user computing device that identifies a relationship of the candidate item to the query.

15. The computer-implemented method of claim 14, wherein said identifying of the query embedding comprises:
identifying plural query-component embeddings respectively associated with query tokens of the query; and
summing the plural query-component embeddings to produce the query embedding.

16. The computer-implemented method of claim 14, wherein said identifying of the item embedding comprises retrieving a single item embedding from a data store that is associated with an item identifier that identifies the candidate item.

17. The computer-implemented method of claim 14, wherein said identifying of the item embedding comprises:
identifying plural item-component embeddings respectively associated with tokens that form at least part of the candidate item; and
summing the plural item-component embeddings to produce the item embedding.

18. The computer-implemented method of claim 17, wherein the item embedding is produced by summing the plural item-component embeddings upon a determination that there is no single item embedding in a data store that is associated with an item identifier that identifies the candidate item.

19. The computer-implemented method of claim 17, wherein the plural item-component embeddings describe respective tokens in a title associated with the candidate item.

20. A computing system having hardware logic circuitry configured to implement the computer-implemented method of claim 14.

21. A computer-readable storage medium for storing computer-readable instructions, one or more hardware processors executing the computer-readable instructions to perform the computer-implemented method of claim 14.

22. The computer-implemented method of claim 14, wherein different computing devices of the training framework store different subsets of a complete set of the training embeddings.

23. A computer-implemented method, comprising:
accessing a data structure;
receiving original count information for a particular target item from the data structure that indicates that the particular target item has been selected a first number of times in response to submission of a query;
receiving other instances of original count information from the data structure that pertain to plural other items, each instance of other original count information indicating that another item has been selected a number of times in response to submission of the same query;
identifying a first embedding associated with the particular target item;
identifying other embeddings respectively associated with the other items;
determining a relation between the particular target item and each of the other items by determining a relation between the first embedding and each of the other embeddings in a vector space, to provide plural similarity scores;
adjusting the original count information for the particular target item by the other instances of original count information, as weighted by the respective similarity scores, to provide revised count information; and
storing the revised count information in the data structure.

24. The computer-implemented method of claim 23, further comprising adjusting a ranking of at least one of the other items in search results provided to a user relative to the particular target item based on the revised count information.

25. A computing system having hardware logic circuitry configured to implement the computer-implemented method of claim 23.

26. A computer-readable storage medium for storing computer-readable instructions, one or more hardware processors executing the computer-readable instructions to perform the computer-implemented method of claim 23.

* * * * *